Patented Aug. 9, 1927.

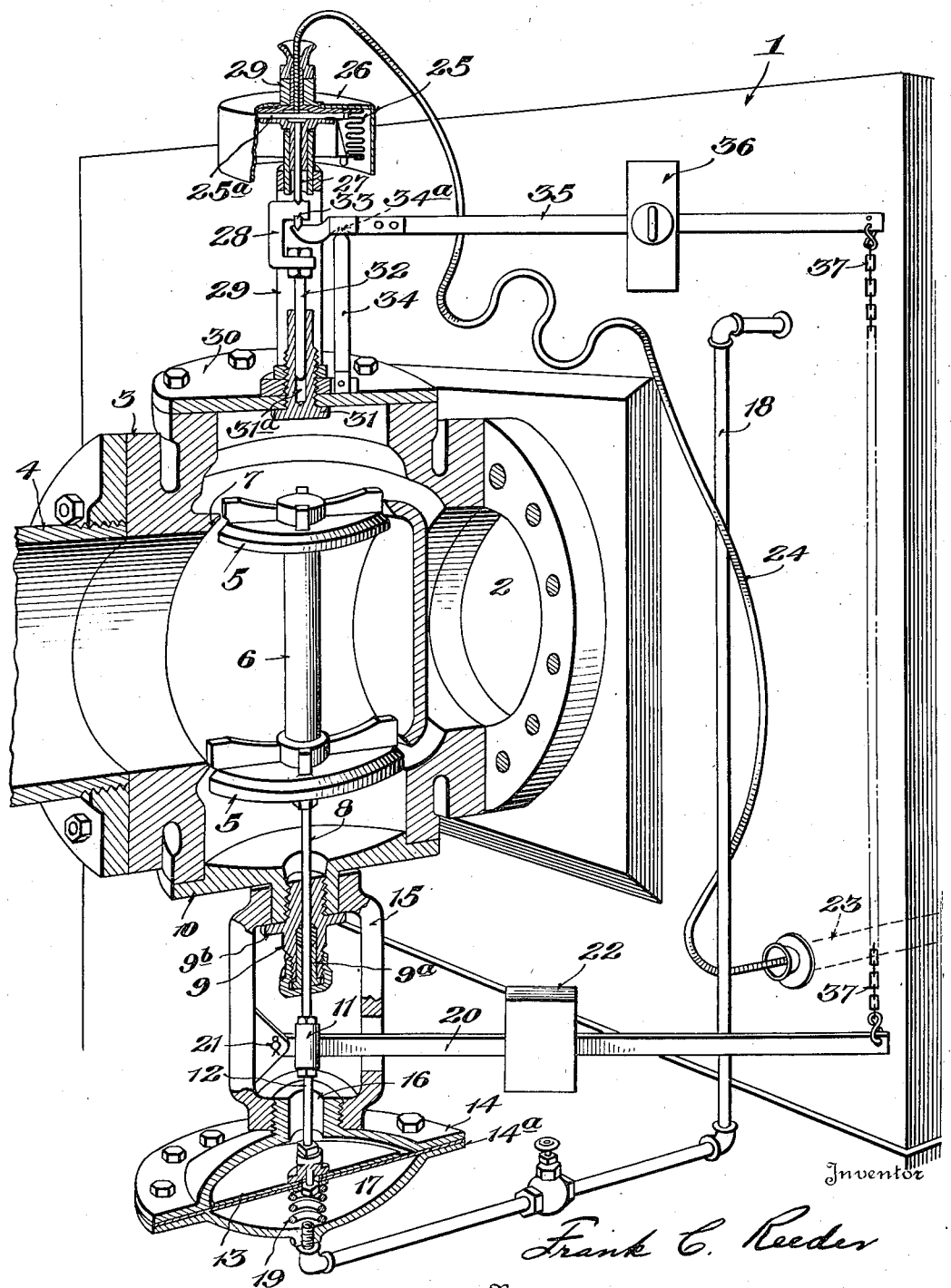

1,638,596

UNITED STATES PATENT OFFICE.

FRANK C. REEDER, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE.

COMBINED TEMPERATURE AND PRESSURE REGULATOR.

Application filed February 20, 1926. Serial No. 89,812.

This invention relates to a combined temperature and pressure regulator.

In certain instances, as for example, in the operation of a feed water heater, it is undesirable to have more than a few pounds pressure within the heater casing, due to structural requirements. At the same time, it is desirable that the temperature of the liquid, or other substance, to be heated, be maintained within predetermined limits. For example, the steam in a feed water heater cannot generally be at less than atmospheric pressure and this pressure corresponds to a temperature of 212° F. However, it may be desirable to heat the liquid in the heater to only 180° F.

An object of the present invention is to provide a novel combined temperature and pressure regulator whereby predetermined pressures and temperatures may be secured and varied as desired.

Another object of the invention is to provide a self-contained regulator of the above type which may be economically manufactured and installed, and which may be readily adjusted.

A further object is to provide a novel, self-contained, combined temperature and pressure regulator which is so constructed that the elements constituting the temperature control may function independently of the pressure control elements, and vice versa.

The invention will be readily understood by reference to the accompanying drawings illustrating one embodiment of the inventive idea but it is to be expressly understood that the drawings are for purposes of illustration only and are not designed as a definition of the limits of the invention.

Referring to the drawings, a single perspective view illustrates, in section, one form of the apparatus constituting the subject matter of the present invention installed in a device 1, such as a feed water heater, wherein it is desired to control the temperature and pressure. The heater 1 is provided with an opening 2 through which steam may be introduced for heating the feed water therein. Attached in any suitable manner to the wall of the feed water heater 1 in position to surround the opening 2, is a valve housing 3, which housing is connected in any suitable manner to a steam pipe 4. Preferably, a balanced valve is employed for controlling the flow of steam to the feed water heater and, as shown, this valve may include a pair of valve disks 5 which are rigidly connected by a valve stem 6, said disks being adapted, upon suitable longitudinal movement, to engage seats 7 formed in the valve housing 3.

Suitably attached to the lower valve disk 5, and in longitudinal alinement with valve stem 6, is a rod 8 that passes through a stuffing box 9, provided with a gland $9^a$, which is suitably threaded into the lower cover plate or valve bonnet 10 of the valve casing 3. The lower end of rod 8 is attached to a yoke member 11 which latter is secured, by means of a suitable connection member 12, to the center of a diaphragm 13. A casing, constituted by two circular flanged members 14 and $14^a$, encloses the diaphragm 13, the periphery of the latter being clamped between the flanges of said members.

Suitable means are provided for securing the diaphragm casing to the valve structure. In the form shown a frame 15 has threaded engagement at the lower end thereof with a boss 16 formed on the upper casing member 14, said boss being suitably apertured to allow the connecting member 12 to pass therethrough. The upper end of the frame 15 may be secured to the valve bonnet 10 by the flange $9^b$ of the stuffing box 9.

The pressure space 17 between the diaphragm 13 and the lower casing member $14^a$ is in communication, via a pipe 18, with the interior of the feed water heater, the pressure in which it is desired to control. Resilient means, such as a coil spring 19, is preferably interposed between the diaphragm 13 and the member $14^a$ to counterbalance the weight of the valve disks 5 and the elements movable therewith. As the pressure in the feed water heater increases, this pressure is transmitted by the pipe 18 to the pressure space 17, whereby the valve disks 5 are raised and brought into engagement with the valve seats 7 to cut off the flow of steam, or to reduce the same, whereby the pressure in the feed water heater is reduced.

In order to control and regulate the movement imparted to the valve disks 5 by the diaphragm 13, suitable means are provided for counteracting the effect of pressure on the diaphragm 13, whereby the amount of pressure within the heater 1 may be maintained within predetermined limits. To this end, a lever 20 which is operatively connected to the yoke 11 in such a manner as to be movable with the latter, is pivotally connected as at 21 to the stationary frame 15. Mounted on the lever 20 is an adjustable weight 22, which acts through said lever to maintain the valve in open position until the pressure in the heater reaches the predetermined limit and overcomes the force exerted by said weight.

Suitable means are provided for controlling the temperature of the fluid to be heated and said means are combined with the pressure control means in such a manner that both of said control means are independently operable or may coact one with the other to secure the desired results. As shown, the temperature control means includes a suitable thermostatic bulb 23 which may be secured at any suitable point in the end wall of the heater 1, the bulb extending into the liquid or medium whose temperature is to be controlled. A flexible tube 24 is employed for operatively connecting the bulb 23 to an expansible and collapsible vessel 25 formed of any suitable material and mounted within a casing or housing 26. The movable end wall 25$^a$ of the vessel 25 is connected, as by means of a rod 27, to a fulcrum member 28. The above named elements of the temperature control means are of any suitable type such, for example, as that illustrated and described in the patent to Weston M. Fulton, No. 1,102,035, dated June 30, 1914. The vessel or bellows 25 and the casing 26 are preferably supported by a frame 29 which is secured to a valve cap or bonnet 30 on the valve housing 3, as by means of a member 31 which is threaded through a suitable opening in the cap 30 and which has threaded engagement with said frame. Preferably, the member 31 is drilled, as at 31$^a$, to slidably receive a rod 32 which is secured to the fulcrum member 28, whereby movement of the latter is limited to longitudinal movement. A knife-edge bearing 33 is suitably secured to the fulcrum member 28 and a similar bearing is provided by a support 34 which may be attached to the valve cap 30. A lever 35 bears upon the knife-edge 34$^a$ formed on the supporting member 34 and also on the knife-edge 33, said lever preferably being provided with suitable bearing notches or surfaces at its points of engagement with the knife-edges. An adjustable weight 36 of any suitable type is slidably mounted on the lever 35. A flexible connecting member, such as chain 37, is secured at a suitable point to lever 35 and the opposite end of the chain is connected to the pressure control lever 20.

When the liquid or other medium to be heated in the heater 1 reaches a predetermined temperature, the liquid in the bulb 23 will have its tension increased and will thus act to force liquid through flexible tube 24 into the expansible and collapsible vessel 25, thereby forcing the movable wall 25$^a$ of said vessel downwardly and simultaneously moving the outer end of lever 35 upwardly. This movement is transmitted through the flexible connection 37 to the lever 20 and through the latter to the valve disks 5, thereby bringing the latter on their seats 7 or closer thereto, whereby the flow of steam through the opening 2 is discontinued or reduced.

The temperature regulating means can only impart a movement to the valve disks 5 which will cause the latter to reduce or discontinue the flow of steam to the casing 1, since the flexible member 37 can only transmit a tensional force. Accordingly, when the temperature in the heater 1 has reached a predetermined value, which latter is controlled by the adjustment of weight 36, the temperature control means will close the valve disks regardless of whether the pressure is at, or below, the predetermined value. On the other hand, it will be seen that the pressure control means may act independently of the temperature control means so that the predetermined pressure in the heater casing 1 never exceeds the predetermined value even though the temperature is below that at which the temperature control means is actuated, or both control means may simultaneously act to secure the desired result.

It will thus be seen that there is provided a composite self-contained temperature and pressure regulator which may be installed as a unit, which is inexpensive to manufacture and simple and sure in operation. The functions performed by two separate instruments heretofore employed are effectively carried out by the composite apparatus. Various changes may be made in details of construction without departing from the invention defined in the following claims.

What is claimed is:—

1. A self-contained temperature and pressure regulator comprising, in combination with a receptacle wherein the temperature and pressure are to be controlled, a conduit for supplying a fluid to said receptacle, a valve for controlling the flow of the fluid through said conduit, adjustable means for normally maintaining said valve in open position, means controlled by the pressure in said receptacle for counteracting the effect of said adjustable means, movable means actuated by changes of temperature in said receptacle, and flexible means for connecting said last-named means with said adjustable means whereby said temperature-responsive means actuates said valve only through said adjustable means.

2. A combined temperature and pressure regulator comprising, in combination with a receptacle wherein the temperature and pressure are to be controlled, a conduit for supplying a fluid to said receptacle, a valve for controlling the flow of fluid through said conduit, means including an adjustable weight for normally maintaining said valve in open position, means responsive to pressure in said receptacle for counteracting the effect of said first-named means, movable means including an adjustable weight responsive to changes in temperature in said receptacle, and flexible means connecting said movable means to said first-named means whereby said temperature-responsive means actuates said valve only through said first-named means.

3. A combined temperature and pressure regulator comprising, in combination with a receptacle wherein the temperature and pressure are to be controlled, a conduit for supplying a fluid to said receptacle, a valve for controlling the flow of fluid through said conduit, means including an adjustable weight for normally maintaining said valve in open position, means including a diaphragm operatively connected to said valve and responsive to pressure in said receptacle for counteracting the effect of said first-named means, movable means responsive to changes in temperature in said receptacle for counteracting the effect of said first-named means, and flexible means for transmitting motion in one direction from said movable means to said first-named means.

4. A combined temperature and pressure regulator comprising, in combination with a receptacle wherein the temperature and pressure are to be controlled, a conduit for supplying a fluid to said receptacle, a valve for controlling the flow of fluid through said conduit, resilient means for counterbalancing the weight of said valve, means including a weighted lever connected to said valve for normally maintaining the latter in open position, means including a diaphragm operatively connected to said valve and responsive to changes in pressure in the receptacle for counteracting the effect of said weighted lever, temperature responsive means including a weighted lever, and flexible means connecting said levers.

5. A combined temperature and pressure regulator comprising, in combination, a fluid containing casing, a conduit for supplying a fluid to the casing, a valve in said conduit for controlling the flow of fluid to the casing, a rod secured to said valve, a diaphragm secured to the rod, a housing for the diaphragm, means connected to the casing and the housing whereby a pressure in the former is transmitted to said diaphragm, a weighted lever operatively connected to said valve, a frame secured to the steam conduit, an expansible and collapsible vessel supported by the frame, a thermostatic bulb extending within the casing and operatively connected to said expansible and collapsible vessel, a lever adapted to be actuated by said vessel, and flexible means connecting said levers.

6. A combined temperature and pressure regulator comprising, in combination, a fluid containing casing wherein the temperature and pressure are to be controlled, a conduit for introducing a medium into said casing, a valve for controlling the flow of the medium through said conduit, a housing for the valve, a rod secured to said valve and extending through said housing, pressure actuated means secured to said rod, a lever secured to said rod, an adjustable weight on said lever, a frame secured to the housing, an expansible and collapsible vessel carried by the frame, a thermosensitive bulb positioned in the casing and operatively connected to said vessel, a fulcrum member secured to the vessel and longitudinally slidable in said frame, a lever having operative engagement with said fulcrum member, an adjustable weight on said lever, and flexible means connecting said levers.

7. A self-contained combined temperature and pressure regulator comprising, in combination, a fluid supplying conduit, a valve for controlling the flow of a fluid through said conduit, pressure responsive means including a diaphragm secured to said conduit and operatively connected to said valve, a weighted lever operatively secured to said valve, temperature responsive means, and flexible means connecting said last-named means and said lever.

8. A self-contained combined temperature and pressure regulator comprising, in combination, a fluid supplying conduit, a valve casing secured to said conduit, a valve in said casing for controlling the flow of a fluid through said conduit, pressure responsive means secured to said casing, said means including a diaphragm connected to said valve, adjustable means connected to said valve for normally maintaining the latter in open position, temperature responsive means including a lever and an adjustable weight thereon, and means connecting said lever to said adjustable means.

9. A self-contained combined temperature and pressure regulator comprising, in combination, a fluid supplying conduit, a valve casing secured to said conduit, a valve in said casing for controlling the flow of a fluid through said conduit, pressure responsive means secured to said casing, said means including a diaphragm connected to said valve, a lever connected to said valve, an adjustable weight on said lever, temperature responsive means including a weighted lever, and flexible means connecting said levers.

10. A combined temperature and pressure regulator comprising, in combination with a receptacle wherein the temperature and pressure are to be controlled, a conduit for supplying a fluid through said receptacle, a valve for controlling the flow of fluid through said conduit, pressure responsive means operatively connected to said valve and receptacle, a weighted lever connected to said valve, temperature responsive means, a weighted lever connected to said last-named means, and a connection between said levers permitting relative movement of the same.

11. A combined temperature and pressure regulator comprising, in combination, a conduit, a valve for controlling the flow of a fluid through said conduit, means normally maintaining said valve in open position, pressure responsive means for counteracting the effect of said first-named means, temperature responsive means, means for counteracting the effect of said temperature responsive means, and a connection between said first and last-named means permitting relative movement of the same.

12. A combined temperature and pressure regulator comprising, in combination with a receptacle wherein the temperature and pressure are to be controlled, a conduit for supplying a fluid to said receptacle, a valve for controlling the flow of fluid through said conduit, pressure responsive means operatively connected to said valve and receptacle, means for normally maintaining said valve in open position, temperature responsive means, a weighted lever operatively connected to said temperature responsive means, and a connection between said lever and second-named means permitting relative movement of the same without moving said valve.

13. A combined temperature and pressure regulator comprising, in combination with a receptacle wherein the temperature and pressure are to be controlled, a conduit for supplying a fluid to said receptacle, a valve for controlling the flow of fluid through said conduit, pressure responsive means operatively connected to said valve and receptacle, a weighted lever normally maintaining said valve in open position, temperature responsive means operatively connected to said receptacle, and connections between said lever and said temperature responsive means permitting relative movement of the same without moving said valve.

14. A combined temperature and pressure regulator comprising, in combination, a conduit, valve means including a valve casing and a valve connected to said conduit, adjustable means normally maintaining said valve in open position, pressure responsive means connected to said valve, temperature responsive means secured to said casing, adjustable means connected to said temperature responsive means, and a connection between said first and second-named adjustable means permitting relative movement of the same without moving said valve.

15. A combined temperature and pressure regulator comprising, in combination with a receptacle wherein the temperature and pressure are to be controlled, a conduit for supplying a fluid to said receptacle, a valve for controlling the flow of fluid through said conduit, means including a weighted lever connected to said valve for normally maintaining the latter in open position, means including a diaphragm operatively connected to said valve and responsive to changes in pressure in the receptacle for counteracting the effect of said weighted lever, temperature responsive means including a weighted lever secured to said conduit, and flexible means connecting said levers.

16. A combined temperature and pressure regulator comprising, in combination, a conduit, a valve for controlling the flow of a fluid through said conduit, means normally maintaining said valve in open position, pressure responsive means for counteracting the effect of said first-named means, temperature responsive means, means for counteracting the effect of said temperature responsive means, and flexible means connecting said first and last-named means and permitting relative movement of the same.

17. A self-contained temperature and pressure regulator comprising, in combination with a receptacle wherein the temperature and pressure are to be controlled, a conduit for supplying a fluid to said receptacle, a valve for controlling the flow of the fluid through said conduit, adjustable means for normally maintaining said valve in open position, means controlled by the pressure in said receptacle for counteracting the effect of said adjustable means, movable means actuated by changes of temperature in said receptacle, and flexible means for connecting said last-named means with said valve.

In testimony whereof I have signed this specification.

FRANK C. REEDER.